Patented Aug. 30, 1932

1,875,070

UNITED STATES PATENT OFFICE

OTTO V. MARTIN, OF TULSA, OKLAHOMA, ASSIGNOR TO TEXACO SALT PRODUCTS COMPANY, OF NEW YORK, N. Y., A CORPORATION OF DELAWARE

PROCESS OF PREPARING CALCIUM CHLORIDE

No Drawing.   Application filed November 20, 1931.   Serial No. 576,423.

This invention relates to a process of preparing calcium chloride from brines or solutions containing the salt, and more particularly to a process of preparing calcium chloride in either the hydrated or anhydrous form from oil field brines. This application is a continuation-in-part of my co-pending application entitled, "Process of preparing calcium chloride," filed November 14, 1927, Serial No. 233,307.

Broadly, the invention provides a process of preparing either substantially pure hydrated or anhydrous calcium chloride from brines containing calcium chloride and other salts by a series of steps including chemical treatment of the brine to remove its corrosive constituents and other impurities, preliminary concentration of the treated brine to a point at which certain other salts present in substantial amounts are largely insoluble, removal by mechanical means of the precipitated salts, further concentration and filtering out of the remaining small quantities of insoluble salts advantageously under relatively high pressure and at high temperatures, treating the filtered brine to liberate its bromine and iodine content, still further concentrating the halogen-free solution to produce upon cooling solid hydrated salt and, if desired, dehydrating this hydrated salt to produce the anhydrous form.

The raw material suitable for use in my process may be any natural or artificially prepared bittern or brine containing calcium chloride and other dissolved salts. Among the principal brines that may be mentioned are oil well and salt well brines and waste brines from the ammonia soda process for preparing sodium carbonate. Sea water also provides a possible source of calcium chloride and can be treated according to my method with slight modifications. As my process has been devised particularly for the preparation of calcium chloride from oil well or oil field brines, it will be described in that connection, although it will be understood that other sources of calcium chloride may be employed and the calcium chloride recovered from such sources by a similar process.

The usual oil field brine, in addition to containing calcium chloride, in general also contains small quantities of magnesium chloride, iron compounds, silica, alumina and relatively large quantities of sodium chloride. In addition, these brines contain appreciable quantities of bromine and iodine. In order that a very pure calcium chloride may be prepared from the brine, it is necessary to remove these various other salts.

The magnesium chloride, iron compounds, silica and alumina may be removed by treating the brine with slaked lime by which means they are precipitated therefrom in the form of a sludge which may be composed largely of magnesium hydrate. This sludge is removed either by settling or subjecting the treated brine to filtration. This separated sludge can then be subjected to suitable chemical treatment for the recovery of its various constituents, particularly magnesium hydrate for the subsequent production of Epsom salts and the like.

The removal of the magnesium chloride at this point is also desirable from the standpoint of rendering the brine non-corrosive; otherwise the magnesium chloride, upon remaining in the brine, tends to hydrolyze during heating in the subsequent steps of the process with the formation of hydrochloric acid which will attack the metal parts of the equipment with which the brine comes in contact.

The brine, now substantially free from iron, silica, alumina, and magnesium compounds, is next subjected to a preliminary concentration step which may be advantageously effected by circulating the brine through a system including a waste heat transfer apparatus adapted to raise the temperature of the brine above the dew point temperature of the atmosphere, and an apparatus for cooling the thus heated brine by evaporation in the atmosphere or under atmospheric pressure. A suitable method and means for carrying out this step in the process has been described in U. S. Patent No. 1,657,633, issued to me January 31, 1928, for "process for the production of salts from brines and solutions."

As described in the above mentioned patent, it is usually sufficient to heat the brine to about 10° F. or more above atmospheric temperatures although a greater temperature differential naturally results in more rapid evaporation. The dissipation of the heat in the liquid as it comes from the heat transfer apparatus is preferably effected in a spray pond by spraying the heated brine through nozzles capable of efficiently atomizing the brine. Other types of apparatus adapted to cool by evaporation are cooling towers, cooling ponds with or without mechanical or natural agitation. The brine is circulated through such a system including a heat transfer apparatus and a cooling-by-evaporation apparatus until the concentration of the calcium chloride in the brine reaches at least 15%, and preferably higher, say between 30% and 50%.

During the concentration of the brine, the bulk of the sodium chloride present therein will be precipitated out of the solution and will be deposited in the pond under the sprays. This sodium chloride may be removed by drag chain conveyors or by any other suitable means, and marketed for the usual purposes of salt.

When the brine has reached the desired concentration in the spray pond system, it is transferred to an evaporating apparatus which may be equivalent in function to a single effect evaporator. An open kettle provided with steam coils may be satisfactorily used at this stage of the process to concentrate the brine solution up to 60% calcium chloride, but at least above 40%, and preferably between 45% and 50% calcium chloride. The concentration is brought about by boiling the brine solution which may be accomplished under atmospheric pressure or advantageously under vacuum.

During this further concentrating step, substantially all of the salts other than calcium chloride, including small amounts of sodium chloride and potassium chloride, will be rendered insoluble and will either be precipitated out or else will remain in suspension in the hot concentrated calcium chloride solution.

This hot solution is then pumped into a closed vessel provided with means for filtering the solution under relatively high pressure. Such a pressure filter may suitably be a closed tank provided with a steam jacket or heating coils to keep the solution hot, and with a false bottom comprised of two spaced perforated plates with a Monel metal screen positioned therebetween. The necessary pressure, which is in general above 150 pounds, and may run as high as 200 pounds per square inch or higher, can be obtained by piping high pressure steam into the space above the solution. During the filtering operation, the salts, principally sodium chloride but usually including some potassium chloride, build up above the false bottom and form a filtering bed which effectively removes the finished suspended salt particles as well as suspended small amounts of calcium or magnesium hydroxide that may be present.

To further facilitate the complete removal of the above salts, which may be slow to precipitate, and also on account of their finely divided nature are rather difficult to filter out, provision may be made to subject the hot solution to settling in tanks advantageously prior to passage through the filtering apparatus.

The calcium chloride solution resulting from this filtering, or combined filtering and settling, operation contains appreciable quantities of bromine and iodine in the form of dissolved salts. In order to produce calcium chloride of a satisfactory degree of purity, it is desirable to remove the bromine and iodine from the calcium chloride solution; otherwise the final product would contain bromides, iodides, or other halogen compounds whose presence is objectionable, particularly in the subsequent use of the calcium chloride in its many industrial applications.

For example, when the chloride is used in the form of a refrigerating brine, any bromides present would undergo decomposition, forming hydrogen bromide which is extremely corrosive to the metal parts of the circulating system with which the brine comes in contact.

In removing or extracting bromine and iodine, the filtered brine may be subjected to treatment in various ways. The more common procedure is to contact the brine, while hot, with chlorine which replaces the bromine or iodine in their salts dissolved in the solution. The thus liberated bromine and iodine is then stripped out of the brine along with any excess chlorine, leaving a substantially halogen-free calcium chloride solution.

The clear hot halogen-free calcium chloride solution, if not already at a concentration of 60% to 70% calcium chloride, is further concentrated to that degree in a second evaporating vessel which may be similar to the one above described. The purpose of this evaporating step is to produce a concentration of calcium chloride from which a solid hydrated calcium chloride will be formed directly upon cooling. The degree of concentration depends upon the particular hydrate desired. Theoretically, a solution containing about 75 grams of calcium chloride per 100 grams of solution, having a boiling point of 175° to 176° C., contains calcium chloride and water in the proper proportions to produce $CaCl_2.2H_2O$ without further evaporation. For practical purposes, however, if the concentration of calcium chloride is raised to between 60% and 70% and the solution then allowed to cool, a substantially dry solid hydrated calcium chloride will be obtained.

This further step of cooling the concentrated pure calcium chloride solution may be accomplished by depositing the solution upon a moving chilled surface. In practice, this may be effected by employing a hollow revolving drum containing a suitable cooling fluid and adapted to be partly immersed in a body of the concentrated calcium chloride solution. A thin film of hydrated calcium chloride is thus formed on the surface of the revolving drum which is removed therefrom by means of a doctor or scraper. In general, the thickness of the film formed is regulated to approximately $\frac{1}{16}''$. The action of the doctor in removing the film from a revolving drum is to break up the film into small parallelogrammatic pieces or plates fairly uniform in size and shape and approximately $\frac{1}{4}''$ square in dimension. I have found that by cooling a 60% to 70% calcium chloride solution in the above manner, the film may be much more easily scored than where a solution of greater concentration is used. Furthermore, a 60% to 70% solution of calcium chloride is much easier to maintain in a liquid state prior to the cooling operation than a calcium chloride solution above 70%.

My process also contemplates the complete dehydration of the hydrated product produced as above, although it will be appreciated that, for some purposes, hydrated calcium chloride will be the desirable end product. Dehydration of the hydrated calcium chloride is effected by slowly passing the flakes or particles of hydrated salt through a heating zone, with continual stirring wherein they are exposed to direct contact with hot drying gases. Preferably, the heated zone is gas fired and provided with means for regulating the temperature so as to vary the characteristics of the final product as desired.

Obviously many modifications and variations of the invention, as hereinbefore set forth, may be made without departing from the spirit and scope thereof, and therefore only such limitations should be imposed as are indicated in the appended claims.

I claim:

1. The process of preparing calcium chloride from oil well brines and the like which comprises treating the brine with slaked lime to precipitate and remove impurities therefrom, including magnesium chloride, silica, alumina, and iron compounds, circulating the purified brine through a heat absorption and a cooling-by-evaporation system until the calcium chloride content of the brine solution has reached 15% or more and during which substantially all of its sodium chloride content is removed, concentrating the solution by boiling to precipitate the remaining chlorides other than calcium chloride, filtering the hot solution under pressure to remove the precipitated salts, reacting the filtered solution with chlorine to liberate bromine and iodine therefrom, removing the liberated bromine, iodine, and any excess chlorine remaining therein, further concentrating the resulting halogen-free brine solution by boiling to form a solution containing upwards of 70% or more of calcium chloride, and cooling the resulting concentrated solution to form solid hydrated calcium chloride.

2. The process of preparing calcium chloride from oil well brines and the like which comprises chemically treating the brine to precipitate and remove impurities therefrom, including magnesium chloride, silica, alumina, and iron compounds, heating and evaporating the brine by spraying in the atmosphere until the calcium chloride content has reached in excess of 15% and during which substantially all of its sodium chloride content is removed, boiling the solution until the calcium chloride content has reached around 50% to precipitate the remaining chlorides other than calcium chloride, filtering the hot solution under pressure to remove the precipitated salts, reacting the filtered solution with chlorine to liberate bromine and iodine therefrom, removing the liberated bromine, iodine and any excess chlorine remaining therein, further concentrating the resulting halogen-free brine solution by boiling to form a solution containing upwards of 70% or more of calcium chloride, and cooling the resulting concentrated solution to form solid hydrated calcium chloride.

3. The process of preparing calcium chloride from oil well brines and the like which comprises chemically treating the brine to precipitate and remove impurities therefrom, including magnesium chloride, silica, alumina, and iron compounds, heating and evaporating the brine by spraying in the atmosphere until the calcium chloride content has reached in excess of 15% and during which substantially all of its sodium chloride content is removed, boiling the solution until the calcium chloride content has reached around 50% to precipitate the remaining chlorides other than calcium chloride, filtering the hot solution under pressure to remove the precipitated salts, treating the filtered solution to remove bromine and iodine contained therein, further concentrating the resulting halogen-free brine solution by boiling to form a solution containing upwards of 70% or more of calcium chloride, and cooling the resulting concentrated solution to form solid hydrated calcium chloride.

4. The process of preparing calcium chloride from oil well brines and the like which comprises heating and evaporating the brine by spraying in the atmosphere until the calcium chloride content has reached in excess of 15% and during which substantially all of its sodium chloride content is removed, boiling the solution until the calcium chloride content has reached around 50% to precipitate the remaining chlorides other than calcium chloride, filtering the hot solution under pressure to remove the precipitated salts, treating the filtered solution to remove bromine and iodine contained therein, and further concentrating the resulting halogen-free brine solution by boiling to form a solution which, upon cooling, solidifies to form the desired hydrated form of the salt.

5. The process of preparing calcium chloride from oil well brines and the like which comprises heating and evaporating the brine by spraying in the atmosphere until the calcium chloride content has reached in excess of 15% and during which substantially all of its sodium chloride content is removed, boiling the solution until the calcium chloride content has reached around 50% to precipitate the remaining chlorides other than calcium chloride, filtering the hot solution under pressure to remove the precipitated salts, treating the filtered solution to remove bromine and iodine contained therein, further concentrating the resulting halogen-free brine solution by boiling to form a solution which, upon cooling, solidifies to form the desired hydrated form of the salt, and cooling the concentrated solution by mechanical means to produce the solid hydrate in the form of flakes or particles.

6. The process of preparing anhydrous calcium chloride from oil well brines and the like which comprises treating the brine with slaked lime to precipitate and remove impurities therefrom, including magnesium chloride, silica, alumina and iron compounds, circulating the purified brine through a heat absorption and a cooling-by-evaporation system until the calcium chloride content of the brine solution has reached 15% or more and during which substantially all of its sodium chloride content is removed, concentrating the solution by boiling to precipitate the remaining chlorides other than calcium chloride, filtering the hot solution under pressure to remove the precipitated salts, reacting the filtered solution with chlorine to liberate bromine and iodine therefrom, removing the liberated bromine, iodine and any excess chlorine remaining therein, further concentrating the resulting halogen-free brine solution by boiling to form a solution which, upon cooling, solidifies to form the desired hydrated form of the salt, cooling the concentrated solution by mechanical means to produce the solid hydrate in the form of flakes or particles, and heating the resulting flakes or particles of hydrate to remove the water of crystallization and obtain the anhydrous salt.

7. The process of preparing anhydrous calcium chloride from oil well brines and the like which comprises treating the brine with slaked lime to precipitate and remove impurities therefrom, including magnesium chloride, silica, alumina and iron compounds, heating and evaporating the brine by spraying in the atmosphere until the calcium chloride content has reached in excess of 15% during which substantially all of its sodium chloride content is removed, boiling the solution until the calcium chloride content has reached around 50% in order to precipitate the remaining chlorides other than calcium chloride, filtering the hot solution under pressure to remove the precipitated salts, reacting the filtered solution with chlorine to liberate bromine and iodine therefrom, removing the liberated bromine, iodine and any excess chlorine remaining therein, further concentrating the resulting halogen-free brine solution by boiling to form a solution which, upon cooling, solidifies to form the desired hydrated form of the salt, cooling the concentrated solution by mechanical means to produce the solid hydrate in the form of flakes or particles, and heating the resulting flakes or particles of hydrate to remove the water of crystallization and obtain the anhydrous salt.

8. The process of preparing anhydrous calcium chloride from oil well brines and the like which comprises chemically treating the brine to precipitate and remove impurities therefrom, including magnesium chloride, silica, alumina and iron compounds, heating and evaporating the brine by spraying in the atmosphere until the calcium chloride content has reached in excess of 15% and during which substantially all of its sodium chloride content is removed, boiling the solution until the calcium chloride content has reached around 50% in order to precipitate the remaining chlorides other than calcium chloride, filtering the hot solution under pressure to remove the precipitated salts, treating the brine to remove bromine and iodine contained therein, further concentrating the resulting halogen-free brine solution by boiling to form a solution which, upon cooling, solidifies to form the desired hydrated form of the salt, cooling the concentrated solution by mechanical means to produce the solid hydrate in the form of flakes or particles, and heating the resulting flakes or particles of hydrate to remove the water of crystallization and obtain the anhydrous salt.

9. The process of preparing calcium chloride from oil well brines and the like which comprises treating the brine with an alkali adapted to precipitate and remove impurities therefrom including magnesium chloride, silica, alumina and iron compounds, preliminarily concentrating the treated brine to precipitate sodium chloride, removing the precipitated salt, further concentrating the brine to about 50% calcium chloride content to obtain practically complete insolubility of remaining undesirable compounds, removing the material thus precipitated, chemically treating the remaining solution to remove bromine and iodine contained therein, then concentrating the brine to about 70% calcium chloride content, and cooling said concentrated brine to obtain substantially pure solid hydrated calcium chloride.

10. The process of preparing calcium chloride from oil well brines and the like which comprises treating the brine with an alkali adapted to precipitate and remove impurities therefrom including magnesium chloride, silica, alumina and iron compounds, preliminarily concentrating the treated brine to precipitate sodium chloride, removing the precipitated salt, further concentrating the brine to about 50% calcium chloride content to obtain practically complete insolubility of remaining undesired compounds, removing the material thus precipitated, chemically treating the remaining solution to remove bromine and iodine contained therein, then concentrating the brine to about 70% calcium chloride content, cooling said concentrated brine to obtain substantially pure solid hydrated calcium chloride, and then dehydrating the hydrated material to remove water of crystallization.

In witness whereof I have hereunto set my hand this 12th day of November, 1931.

OTTO V. MARTIN.